United States Patent [19]

Hoelscher

[11] Patent Number: 4,611,291

[45] Date of Patent: Sep. 9, 1986

[54] VITAL INTERFACE SYSTEM FOR RAILWAY SIGNALLING

[75] Inventor: James R. Hoelscher, Rochester, N.Y.

[73] Assignee: General Signal Corp., Rochester, N.Y.

[21] Appl. No.: 550,430

[22] Filed: Nov. 10, 1983

[51] Int. Cl.[4] ...................... B61L 27/00; G08B 21/00; G01R 19/15

[52] U.S. Cl. ........................................ 364/550; 246/3; 246/5; 307/413; 340/664

[58] Field of Search ................ 340/664; 364/184, 550; 246/2 R, 3, 5, 121, 167 R; 307/413; 324/117 R

[56] References Cited

U.S. PATENT DOCUMENTS 3,219,814 11/1965 Livingston ............................. 246/3

3,953,682 2/1976 Daniels et al. ................. 307/413 X 3,976,272 8/1976 Murray et al. .......................... 246/5

4,305,556 12/1981 Norton et al. .......................... 246/5

4,307,463 12/1981 Sibley ................................ 246/5 X

*Primary Examiner*—Errol A. Krass

*Assistant Examiner*—Edward R. Cosimano

*Attorney, Agent, or Firm*—Martin LuKacher

[57] ABSTRACT

An interface system providing vital inputs to and vital outputs from a vital processor of railway signals for railway signalling and control purposes, utilizes non-vital components such as diodes and transistors. The input interface translates a railway signal, for example, from a relay contact closure of a track relay, into a multi-bit serial digital signal representing a restrictive state of the input railway signal in the event of any failure in the input interface. The output interface utilizes an absence of current detector having a saturable transformer coupled to an output line which provides operating current to railway signal and control devices, such as relays, switch machines and signal lamps. A vital relay having a vital driver operated by the processor or control system is operated to drop away upon the detection of a failure, as indicated by the absence of current detectors or in the processor or in the control system itself, to disconnect operating power from the output interface and condition it to provide the restrictive, no-current condition on the output lines thereof.

27 Claims, 7 Drawing Figures

VITAL INTERFACE SYSTEM FOR RAILWAY SIGNALLING

DESCRIPTION

1. Field of the Invention

The present invention relates to railway signalling systems and particularly to a vital interface system enabling the use of non-vital components for handling input signals to and output signals from a railway control system, especially a vital processor, and interfaces sources of input railway signals with output railway signal and control devices, such as signal lamps, control relays and switch machines.

The invention is especially suitable for use in an interlocking control system which operates with the railway signal generating and traffic control devices (the switches and signals) of a junction or other complex of tracks which may contain several track sections, crossovers and sidings.

2. Background

Installations for railway signalling and control purposes must exhibit vital or failsafe characteristics. By vital is meant that the installation is guarded against failures and if a failure occurs, the failure produces a safe or restrictive mode of operation or control of the traffic. Generally, relay systems have been used for vital signalling and control. Such relays are designed to guard against failures, as by having contacts of materials which cannot weld or fuse. The design of the relay is such that any failure causes the relay to drop away and place the signal or control in the restrictive or safe state. While relay systems are generally accepted by the railway industry and comply with standards established by organizations concerned with safety, such as the American Association of Railroads, it is desirable to use non-vital components as may contain transistors and diodes, for railway signalling and control purposes. The problem of providing interface systems utilizing such non-vital components which operate in a vital manner in a way which is cost effective without sacrificing safety considerations has challenged the railway signalling art.

OBJECT AND BRIEF DESCRIPTION OF THE INVENTION

It is a feature of this invention to provide a vital interface system which handles inputs to and outputs from a railway control system which operates in a vital manner, called a vital processor herein, which interface system utilizes non-vital components and provides vital operations in a cost-effective manner.

In accordance with one aspect of the invention, a vital input interface between a source of railway signals and the vital processor, the source being a DC signal from the contacts of a vital relay, for example, provides a serial digital signal which represents a restrictive state of the input signal in the event of any failure in the input interface.

In accordance with another aspect of the invention, vital output interface circuits are provided, which interface the vital processor with railway signal and control devices, such as relays, signal lamps and switch machines, which are continually checked under the control of the vital processor for a failure in the interface and even for a failure in the railway signalling device, such as a burned out signal lamp, and as a result of the checking, the output is conditioned to a restrictive or safe mode in the event of any failure thereby providing vital operation.

In accordance with still another aspect of the invention which may be used for checking the vital output interfaces, an absence of current detector is provided utilizing a saturable magnetic circuit for the transmission of digital check signals which may be generated in the vital processor back to the vital processor for detecting a failure in the output interface.

In accordance with still another aspect of the invention, a vital decoder may be provided which is driven by the vital processor, preferably with a tuned vital drive detector which is responsive to modulated alternating current (AC) signals, the presence of which represents that the vital processor and the output interfaces associated therewith have not failed, such that in the absence of the AC signal a vital relay is caused to drop away, thereby disconnecting operating power to the output interfaces and placing the outputs and the railway signal and control devices connected thereto in their restrictive, safe state. The aspect of the invention involving the vital decoder makes use of circuits automatically operative in the absence of the AC signal to cause the vital relay to drop away rapidly and rapidly place the outputs in their restrictive, safe state.

It is still another aspect of the invention to provide output interface circuits utilizing electronic switches, such as transistors which provide outputs equivalent to the single break and lamp drive outputs of relays and even to the double break or bi-polar outputs produced by relays.

Briefly described, an interface system for inputs and outputs from a vital processor of railway signals which embodies the invention, utilizes vital input interface means connected to and operable under the control of the vital processor for translating inputs and sources of railway signals into a plurality of serial digital signals, the format of each of which represents a fault in the input interface itself. A plurality of output interfaces is also connected to and operated by the vital processor for controlling the operation of the railway signal and control devices. The output interfaces each includes means operated by the vital processor for repeatedly checking the validity of operation of the output interface means. A vital decoder may also be part of the interface system and is operable by the vital processor in response to outputs from the checking means therein for inhibiting the output interfaces from controlling the railway devices to place them into an unsafe condition, such that a failure in any of the output interfaces results in placing the railway signal and control devices into their restrictive, safe state.

BRIEF DESCRIPTION OF THE DRAWINGS

The foregoing and other objects, features, aspects and advantages of the invention will become more apparent from a reading of the following description in connection with the accompanying drawings in which.

DETAILED DESCRIPTION

Figure 1:
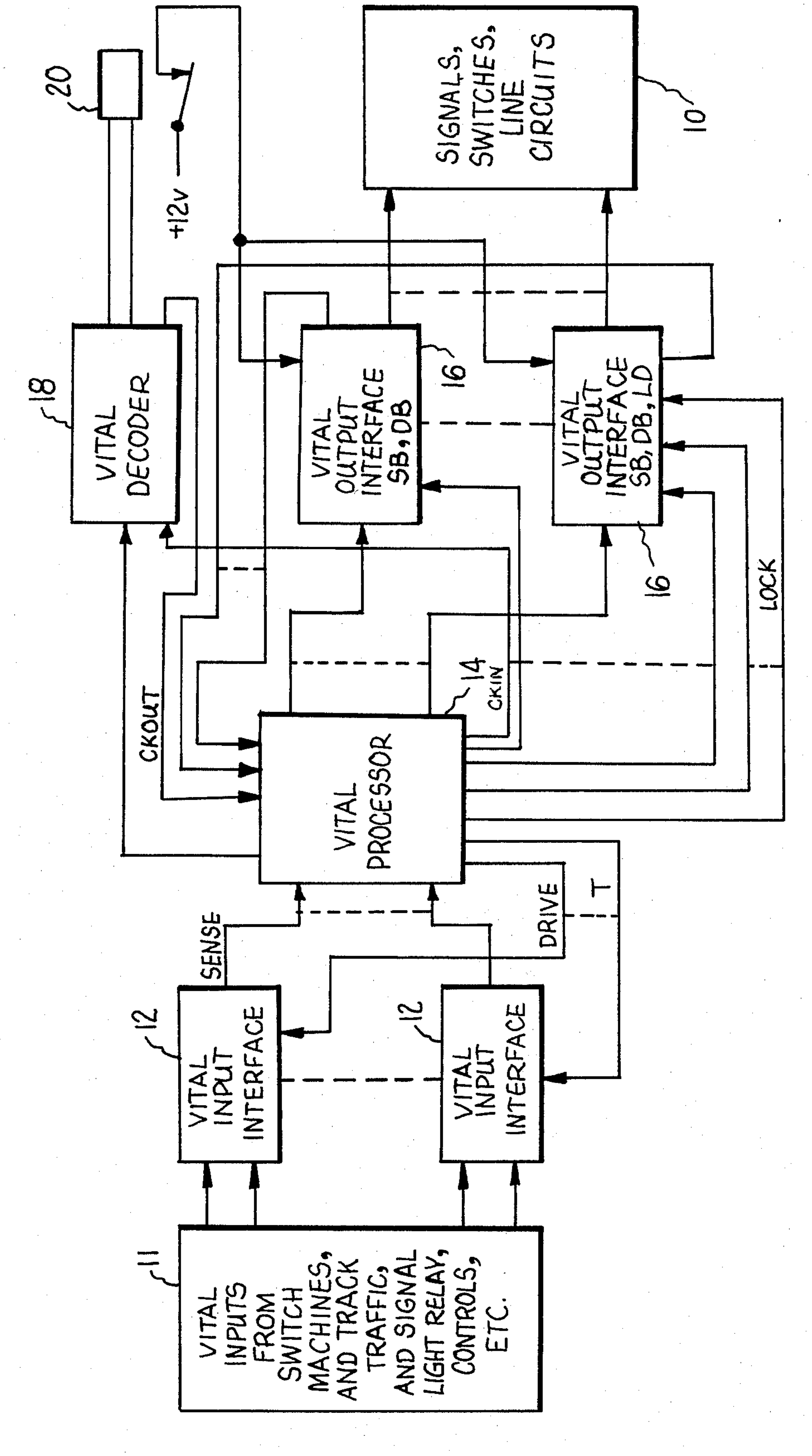
FIG. 1 is a block diagram schematically showing a vital interface system for railway signalling which embodies the invention.

Referring more particularly to FIG. 1, there is shown a railway signalling and control system which may be interlocking with respect to the signals, switches and line circuits in a junction or other complex of tracks. These signals, switches and line circuits are represented by the block 10 and receive outputs from the system. The output lines from the system which go to the signals, switches and line circuits 10 are output lines for DC current which operates the signals (the lamps or the relays which operate the lamp circuits). The DC current on the output lines may also control the relays of switch machines and of line circuits which carry signals along or between sections of track. Sources of railway signals provide vital inputs 11. These inputs may be the contacts of relays in the track, traffic and signal light relay controls or from the contacts of switch machines. Vital input interfaces 12 are provided for each input. Since the input lines are the vital lines which float on the railway signal battery (usually a 12-volt battery or other power supply), two input lines are shown connected to each vital input interface 12. In a typical system there may be 96 vital input interfaces. In a system which processes data in sixteen bit words, 16 vital input interfaces may be mounted on individual input interface printed circuit boards and six such vital input interface boards may be used.

The output lines from the vital input interfaces are called sense lines and provide digital signals to a vital processor 14. The sense signal input lines may be the data lines of the vital processor. The output lines from the vital processor may also be these data lines. However, the input or sense lines and the output lines from the vital processor are shown as separate groups of lines to clarify the illustration. The vital processor 14 is suitably a microprocessor system with its own central processing unit and memory. The microprocessor may be programmed to provide interlocking between the signals, switches and line circuits of the vital inputs 11 and the signals, switches and line circuits 10. The switches, signals and line circuits may also provide inputs to the system and then would be considered to provide, in part, the vital inputs 11. The vital processor 14 evaluates the input digital signals on the sense lines and provides the interlocking control functions. These are expressed as outputs which go to vital output interfaces 16. A separate vital output interface is provided for each signal, switch and line circuit 10. The vital outputs simulate and provide equivalent single break (SB), double break (DB) and lamp drive (LD) outputs on their output lines. Not all the vital output interfaces provide lamp drive (LD) outputs.

The vital processor not exclusively, but which is especially suitable for use in the system is of the type described in a patent application, filed concurrently, in the name of David Rutherford, and assigned to the same assignee as the present application (Ser. No. 550,693). The Rutherford vital processor, insofar as is related to this invention is described hereinafter.

The system also includes a vital decoder 18 which receives outputs from the vital processor representing failures in the vital processor itself or in any of the vital output interfaces 16. These inputs may be in the form of digital words which are received by the vital decoder and concentrated as by microprocessor based logic in the input of the vital decoder. Control signals resulting from these words are translated into a pulse train wherein the pulses are repetitive at a carrier frequency which is modulated at another frequency (double modulation) and provides a vital drive signal. The lower frequency component of the vital drive signal is detected and provides an AC signal which is decoded for its presence or absence. When the signal is present, the decoder causes a vital relay 20 to pull in by passing current through its operating winding. Then, operating power from a source of vital voltage indicated as 12 volts is applied through the contacts of the vital relay 20 to the vital output interfaces. In the event of a failure in the vital processor or in the vital output interfaces, the AC signal is no longer detected and the decoder 18 causes the vital relay 20 to drop away rapidly from the vital output interfaces. The signals, switches and line circuits 10 are then cut off and the signals, switches and line circuits are conditioned to their restrictive, safe state.

Vital output interfaces 16 and the vital decoder 18 are checked by check signals indicated as CKIN which are applied thereto. These signals are utilized in absence of current detectors in the vital outputs 16 and the decoder 18 and produce checkout signals (CKOUT) which go to the vital processor. The data lines may be used also for this purpose. In other words, the sense input lines to the vital processor, the output lines to the vital outputs 16 and the CKIN and CKOUT lines may all be data lines in the data bus of the vital processor. Another checking input to the vital output interfaces 16 which provide lamp drive outputs is provided over light output check (LOCK) lines. The LOCK lines may also be lines in the data bus of the vital processor. These light output check pulses check the integrity of the signal lamps and the absence of current detectors produce check outputs on the CKOUT lines of the LD vital outputs when a lamp fails, by its filament becoming open.

The vital processor also provides inputs on the drive lines to the vital input interfaces 12. These drive inputs are translated into multi-bit serial digital signals on the sense lines. The drive lines may be the data lines of the vital processor. Consider that the vital processor has sixteen data lines in its data bus. During each cycle of operations a sequence of bits which may be different for each vital input interface is provided on the data lines, for example, 24 sequential bits in defined formats (predetermined sequences of ones and zeros in each 24 successive bits). If more than 16 input interfaces are used, a first group of 16 of them will receive drive digital signals, then the next group of 16 input interfaces, until all of the input interfaces are interrogated. The state of the vital inputs determines the sense signals which are produced and applied to the vital processor. If a vital input is in a permissive state, for example, a relay contact is closed, and the vital input interface is operating without fault or failure, the serial digital signal on the sense output will be in the same format as the drive digital signal. Preferably, the sense digital signal is inverted (complementary) to the drive digital signal to further insure the vital operation of the input interface. If, however, the vital input is in its restrictive state, for example, the relay contact is open, the digital signal on the sense line will be a sequence of zeros or ones which represents a restrictive condition. The output of a vital interface thus always represents a restrictive condition, in the event of a failure in the vital input interface circuitry. Vital characteristics of operation are thereby provided in the vital input interfaces.

The vital processor processes the multi-bit serial digital signals from the sense lines and also processes multi-bit digital signals from the CKOUT lines which are produced in the vital outputs 16. The result of this processing is the output drive signals to the vital decoder 18 and to the vital output interfaces 16. The vital processor evaluates the input signals thereto on the sense lines as well as the CKOUT lines from the vital outputs 16. In a vital manner, the sense inputs are evaluated in accordance with logic expressions associated with the interlocking requirements and, using the results of the evaluations, controls the signals, switches and line circuits 10 through the vital outputs 16. If a failure occurs in the vital processor 14 itself or in the vital outputs 16 or in the vital decoder 18, the pulse train to the vital decoder lacks the AC component, thereby causing the vital relay 20 to disconnect operating power from the vital output and place the signals, switches and line circuits 10 in their restrictive, safe condition. In the case of such a failure, the vital processor attempts to reinitiate operations. If repeated failures occur, an alarm signal is indicated and may be transmitted to a monitoring location. Traffic, however, is halted and the only consequence is a delay in the movement of the traffic. Accidents are avoided because of the vital characteristics of the components of the system.

The vital processor 14, which may suitably be provided in accordance with the invention of the above referenced Rutherford application, senses the binary data which is applied thereto in a vital fashion. The processor includes the data bus with plural conductors. Also included is a memory maintaining a table of multi-bit data units for outputting to the data bus one or more of these multi-bit data units in parallel, unit serial order. This outputting provides the drive to the vital input interfaces. The vital input interfaces are coupled to separate conductors of the data bus. The vital processor includes transposition means coupled to the data bus and responsive to the digital signals placed thereon by the vital input interfaces. These transposition means temporarily store the sequences of received multi-bit data units, which, of course, are equal in length to the multi-bit data units (24 bits in the example mentioned above) which come from the memory of the vital processor and go out on the drive lines. The multi-bit data units from the sense lines are transposed from bit parallel units serial order to unit parallel bit serial order. The processor operates on a table of multi-bit values corresponding to input parameters to produce a table of multi-bit values corresponding to output parameters in accordance with a sequence of Boolean equations, each equation including one or more terms in a sum of products format wherein each term is defined as a product of one or more functions. These functions are placed in a first input matrix storing a set of first input representations, each first input representation is a multi-bit representation different from any other first input representation. Each first input representation includes a value bit. A second input matrix stores a set of second input representations. Each second input representation is a multi-bit representation different from any other second input representation. Each second input representation corresponds to a different first input representation and also has a value bit. The processor also has Boolean expression storage means for storing a sequence of Boolean expressions relating to input functions and output functions. The logic of the processor is also responsive to the data in the Boolean expression storage means and to the first and second input matrices for deriving values corresponding to the output functions. The processor has selecting means which selects each Boolean expression for evaluation. Then scanning means responsive to the selection of a given Boolean expression in turn evaluates each term in the expression in predetermined order by determining the value bit of each related first input representation to locate any term with a given value or for determining that no term has this given value. The processing is done in a polynomial divider. Each first input representation for each parameter of a term is located by the scanning means and thereafter stores a resulting first sum in a location in an output matrix corresponding to a selected output parameter. Then each second input representation of the same term which is located by the scanning means is summed in the polynomial divider and a resulting second sum is stored in the output matrix corresponding to the selected output parameter. The first and second sums are verified as to whether or not they are expected valid sums. The output from the vital processor to the vital decoder has a value depending upon whether the operation on the sense inputs or on the CKOUT inputs to the vital processor represent a failure in the vital processor or in any of the vital outputs 16. The value of this output is a digital word which is decoded in the vital decoder, after concentration, and utilized to provide the AC vital drive signal which is detected to operate the vital relay 20.

Figure 2:
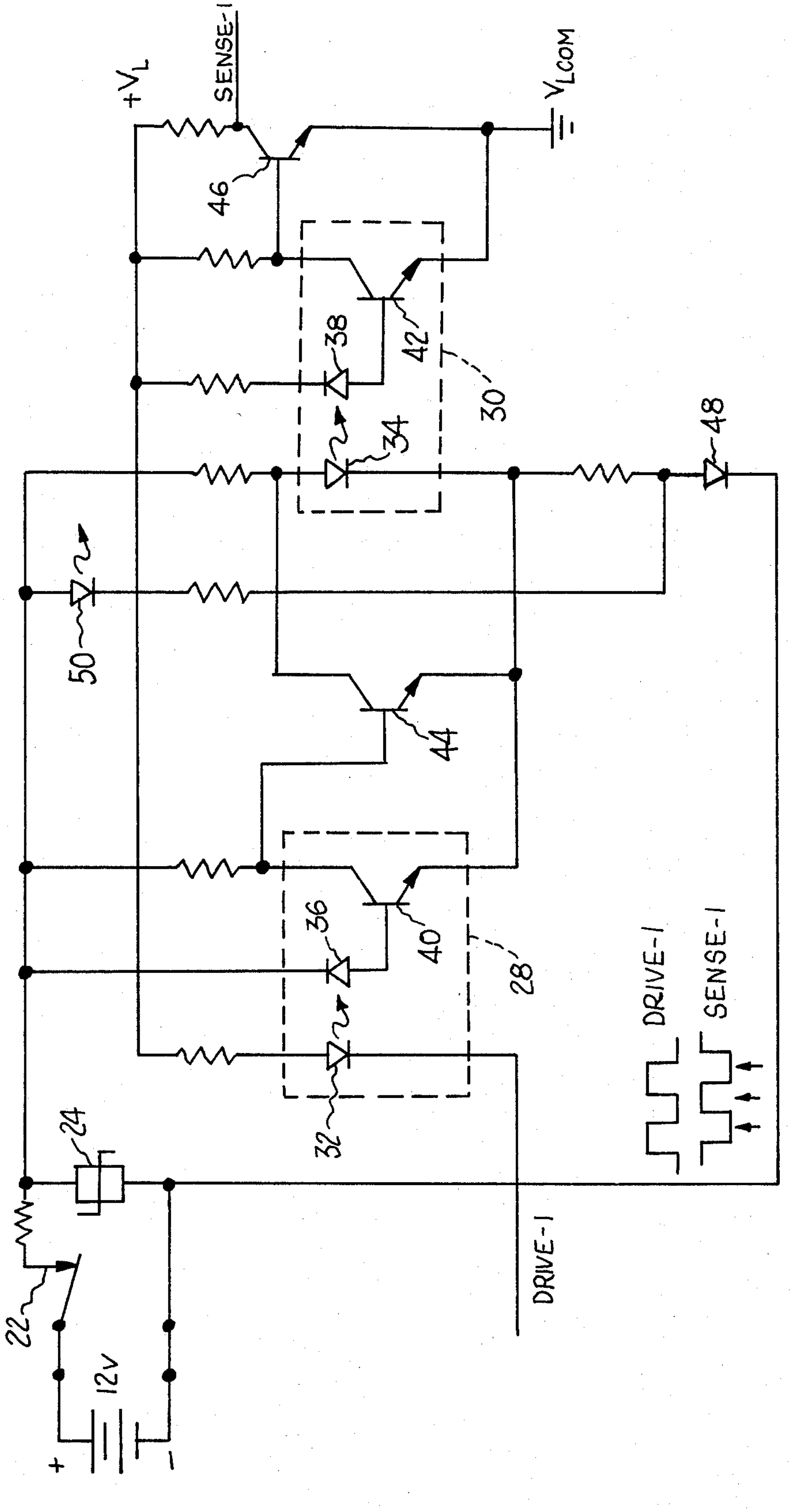
FIG. 2 is a schematic diagram showing one of the vital input interfaces used in the system of FIG. 1.

The vital input interfaces 12 may each be provided by a circuit such as shown in FIG. 2. The vital input is shown as the railway signalling source of energy (a 12-volt battery, by way of example) and contacts 22 of a railway signal source, for example, a track relay, switch machine contact or the like. This railway signal may be applied along input lines over some distance to the vital input interface circuit which preferably is contained in a protected environment usually closely adjacent to the vital processor and the vital outputs and vital decoder 16 and 18. To guard against any overvoltage which may be picked up on the input lines to the vital interface, a transient (lightning) suppressor such as a varistor 24 is connected across the lines with a resistor 26 to develop a voltage due to transient current which cause the varistor 24 to shunt the input to the vital input interface.

The floating battery and the vital railway signalling device which controls the contacts 22 provide a source of vital energy to the vital input interface 12. Another source of power, suitably 5 volts, and indicated as being applied to the interface between terminals $V_L$ and $V_{LCOM}$ (shown as ground) is suitably obtained from the same power supply which provides operating voltage to the vital processor 14. The power supply need not be vital in operation. The interface 12 receives one of the drive inputs, shown as DRIVE-1 and produces one of the sense outputs, shown as SENSE-1. The interface maintains isolation between the power supply which provides the $V_L$ voltage and the vital energy source by means of optical isolators 28 and 30. These isolators contain light emitting diodes 32 and 34 as emitters. Receptors of the light from the LEDs 32 and 34 are photodiodes 36 and 38. The isolators contain transistors 40 and 42 to increase their current output. A switching transistor 44 is connected between the receptor output of the input isolator 28 and the light emitter input of the output isolator 30. Another switching transistor 46 connects the output isolator 30 to the SENSE-1 output line.

A diode 48 which completes the circuit from the positive to negative terminals of the 12-volt battery, protects the isolators 28 and 30, the transistors 40 and 42 therein and the transistor 44 which is connected between the isolators 28 and 30. A light emitting diode 50, which is effectively connected across the battery when the contacts 12 are closed, is also then operated and serves as an indicator useful when maintaining the interface 12. Closure of the contacts 22 applies DC operating voltage to the output transistor 40 of the first isolator 28 and also to the LED 34 emitter of the second isolator 30. Operating voltage is also then applied to the transistor 44 which interconnects the isolators 28 and 30. The drive digital signal is a sequence of high and low logic levels which represent binary one and binary zero bits, respectively. Three bits of the signal DRIVE-1 are shown adjacent to the DRIVE-1 output line. The SENSE-1 output which is obtained when the input interface is operating properly and the contacts 22 are closed, are shown immediately below and in the same time scale as the DRIVE-1 input signal.

With the DRIVE-1 input at a high logic level, the output transistor 40 is maintained nonconductive and the first isolator 20 may be considered to be in its off state. With the transistor 40 nonconducting, the transistor 44 is biased on. Therefore, the LED 34 is shunted and held off. Then, the output transistor 42 of the second isolator 30 is biased off. The output transistor 46 which drives the sense line is then on and the sense line is held at a logic low level. There may be a slight delay in the propagation of the drive pulses (bits) through the circuit. In order to accommodate for this delay, it is desirable to adjust the timing in the vital processor so as to sample the sense line at the instants indicated by the arrows next to the SENSE-1 waveform.

Conversely, when the DRIVE-1 line is driven to a logic low, the first isolator 28 turns on, the transistor 44 turns off. The second isolator is then turned on which causes transistor 46 to be switched off. The sense line is then at a logic high level. A signal inversion occurs between the DRIVE-1 and SENSE-1 lines. This enhances the vital operating characteristic of the interface in that the DRIVE-1 cannot pass through the circuitry and directly appear at the output sense line during a failure mode.

If the contacts 22 are open, the vital energy is not present. Then an input signal on the DRIVE-1 line does not effect the output and the SENSE-1 line remains at logic low level. Accordingly, if the digital signal of specified format is applied to the drive input, the inverse or complementary digital signal will appear at the sense output only if there is vital energy present and the contacts 22 are closed. The closed state of the contacts represents the permissive condition. A restrictive condition is represented by open or dropped away contacts. A failure in the interface 12, just like the opening of the contacts 22, prevents the digital signals of the prescribed format from appearing at the sense output lines. Thus, a failure in the interface 12 produces a restrictive indication.

The optical isolators 28 and 30 may suitably be of the 6N136 type. The digital signal then can be transmitted at a high pulse rate, for example, 80 KHz. Since the current from the vital energy source (the 12-volt battery) is being switched between the collector and the emitter path of the transistor 44 and the input LED 34, the current remains essentially constant. Maintaining this current constant during the transmission of the drive signal reduces any significant change in the average input current from the vital energy source. Thus, use of the switching transistor 44 improves the condition of the waveform passing through the interface from the drive input to the sense output thereof.

Figure 3:
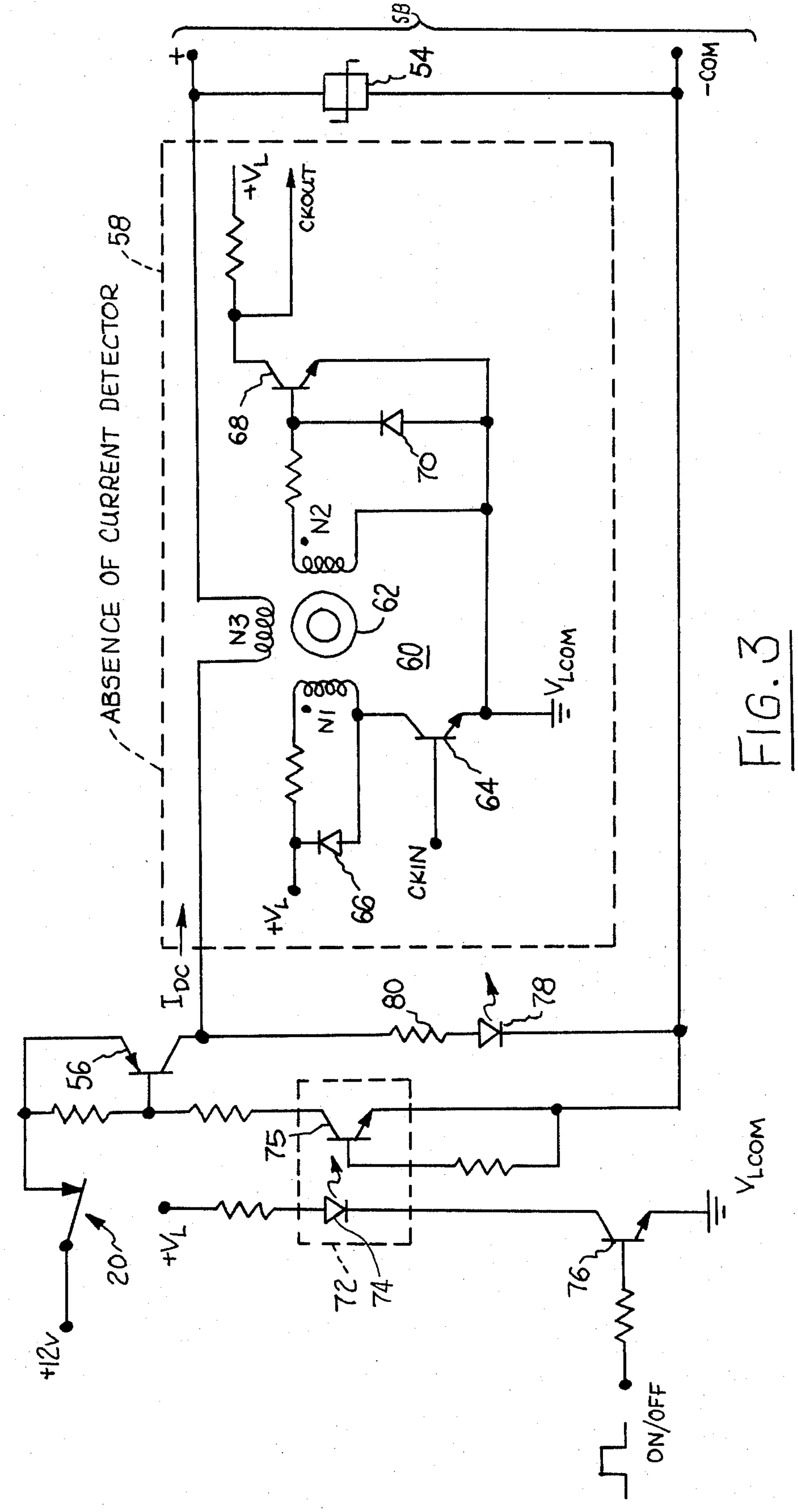
FIG. 3 is a schematic diagram illustrating one of the vital output interfaces which provides a single break output in an output line; the diagram also showing an absence of current detector used in checking the operation of the vital output interface.

Referring to FIG. 3, there is shown a vital output interface which provides a single break (SB) output equivalent to a relay contact which controls positive energy supply to a load. Such a load may be a railway signal or control device such as the operating winding of another relay. The SB output is provided between floating positive and negative or common terminals which may be considered connected to an output line which carries direct current ($I_{DC}$). A varistor 54 connected across the SB output provides transient protection for lightning and the like as was explained in connection with the varistor 24 (FIG. 2). The output energy for the SB outputs, that is the $I_{DC}$ current, is controlled by a switching transistor 56, which unlike B relay contacts which are made of special materials to prevent their welding or fusing, may short. Accordingly, the output interface must be checked in order for it to be considered to have vital characteristics.

The checking is accomplished by an absence of current detector 58. A similar absence of current detector is used in all of the vital outputs and also in the vital decoder 18 (FIG. 1) and it is connected in the output line which carries the output current $I_{DC}$. A CKIN line is connected to the absence of current detector as is a CKOUT output line. A digital signal is permitted to be passed from CKIN to CKOUT, if and only, if $I_{DC}$ is less than a specified level preferably less than 50% of the current necessary to maintain or hold operated the output device which is connected to the interface. For example, if a relay operating winding is connected to the SB output terminals and the amount necessary to hold in the relay is 5 to 6 milliamps, transmission through the detector 58 will occur only if $I_{DC}$ is less than from 2 to 3 milliamps. In other words, $I_{DC}$ less than 50% of the necessary level for operating railway signalling and control devices as detected as an absence of current.

Figure 4:
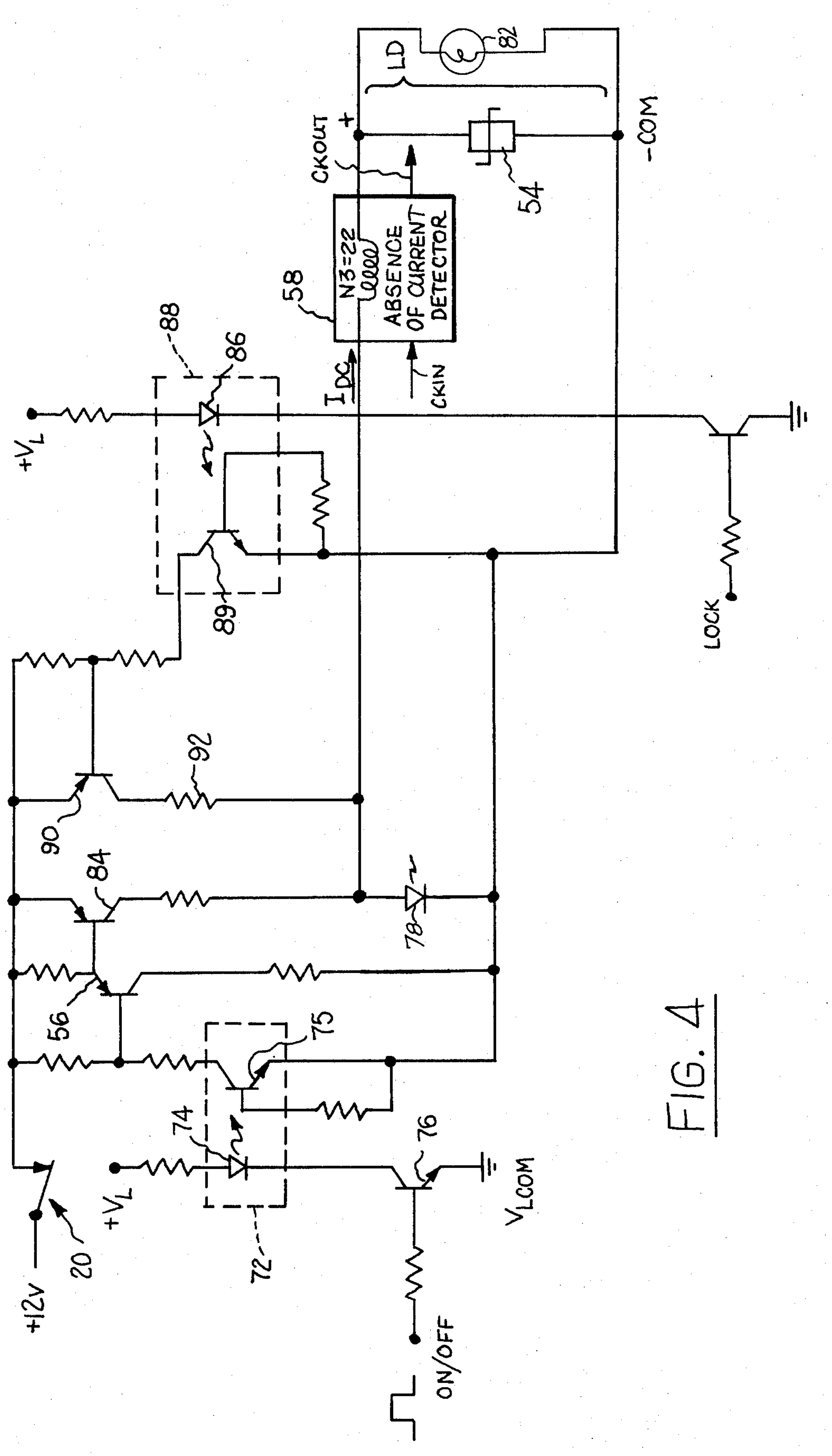
FIG. 4 is a schematic diagram which illustrates a vital output interface which provides a lamp drive output.

The absence of current detector utilizes a saturable core transformer 60. The core 62 is preferably a tape wound ring of soft magnetic material having high permeability and a flat BH characteristic in its saturation region. A suitable magnetic material is supermalloy which is an alloy of nickel (80%), molybdenum (5%) with the balance iron. The T-9120 core sold by Arnold Engineering Company of 300 West Street, Marengo, Ill. 60152, which is a ring approximately $\frac{1}{2}''$ outside diameter, $\frac{3}{8}''$ inside diameter and $\frac{1}{4}''$ in axial length has been found to be suitable for use with currents in the 2–6 milliampere range. Two windings, an input winding indicated as N1 and an output winding indicated as N2 are wound on the core 62. Another winding N3 which serves as a control or saturating winding is also wound on the core 62. Suitably N1 and N2 may be 168 turns and N3 360 turns for the single break output interface circuit shown in FIG. 3. A similar number of turns for the 3 windings may be used in the absence of current detectors for the double break output circuit shown in FIG. 5 and in the vital decoder circuit shown in FIG. 6 and in FIG. 6*a*. A smaller number of turns, for example 22 turns, for the control winding, N3, has been found suitable for use in the lamp drive or LD output interface when lamp out (open filament) checking is desired. The LD output interface is shown in FIG. 4.

The input circuit to the absence of current detector to which the CKIN line is connected includes a transistor 64. A diode 66 is connected across the input winding N1 to absorb transient currents upon current cutoff through the winding N1. The output circuit which is connected to the CKOUT line employs a transistor 68 and another protective diode 70. Operating voltage for the input and output circuits of the detector 58 come from the 5 volt vital processor power supply and are indicated at $V_L$ and $V_{LCOM}$. The N1 and N2 windings should be isolated from the N3 winding. This may be accomplished by winding the transformer with insulation between the windings which will withstand high voltage, suitably 3,000 volts AC which is the standard insulation level approved by the American Association of Railroads (AAR). Isolation and prevention of breakdowns, as was the case in the input interface, is provided by inversion of the CKIN signal as it passes through the detector 58 to the CKOUT output.

A serial digital signal, suitably a pulse train as was described in connection with the input interface drive (FIG. 2) is applied to the CKIN line from the vital processor. The input transistor converts each pulse to a current pulse which passes through the input winding N1 of the transformer 60. If the transformer is not saturated, the current pulse in N1 is magnetically coupled through the core 62 to the output winding N2. The resulting pulse drives the output transistor 68. A high logic level (plus $V_L$) at CKIN turns the transistor 64 on which results in the output transistor 68 also turning on. Then, the corresponding logic level on the CKOUT line is a low level. Conversely, a low level (0 volts) at CKIN turns transistor 64 off which results in the output transistor 68 also being off. The CKOUT line is then at a high logic level. Thus, the signal at CKOUT is the inverse in polarity of the signal at CKIN and the digital bits are complementary.

If the current in the control winding is greater than 50% of the current necessary to maintain the device connected to the SB output terminals in its energized state, the core 62 becomes magnetically saturated. The core then operates on the flat portion of its BH curve. The current pulse corresponding to inputs at CKIN do not change the flux level in the core 62. Therefore, there is no change in flux and no output across the output winding N2. In other words, there is no transmission through the transformer of the digital signal. The CKOUT line then remains in its high state.

The SB output interface of FIG. 3 makes use of an optical isolator 72 havi-ng a LED emitter 74 and a phototransistor receptor 75. The output from the vital processor provides logic high and logic low (on/off) inputs to a control transistor 76. A logic high (plus $V_L$) turns the transistor 76 on, which causes the switching transistor 56 to be turned on. Power for the output circuit comes from a source of vital energy, namely the vital relay 20, the contacts of which are shown in FIG. 3. When the transistor 56 is turned on, $I_{DC}$ flows through the output line and to the device connected across the SB terminals. An LED 78 connected in series with a high value resistor 80 then turns on to indicate that $I_{DC}$ is present. The LED 78 serves as an indication of operation of the circuit and facilitates maintenance.

In order to check the output interface, the on/off input is periodically placed in the off or logic low state. This may take place once every second during the operation of the interface system. In addition, each output is checked every 50 milliseconds. Then the multi-bit serial digital word is applied to the CKIN line of the absence of current detector. If $I_{DC}$ is below saturation level of the core 62, the detector transmits the digital signal from the CKIN input to the CKOUT output with an inversion. If $I_{DC}$ is above the saturation level, there will be no transmission, and the signal level at CKOUT will be a logic high. For outputs that the processor is not placing in the on state, the vital processor interprets the logic high signal during the check interrogation interval as a failure and signals the vital decoder (18 FIG. 1) such that the vital relay 20 is deenergized and drops away. With no operating current applied to the vital outputs, they are all reset into their restrictive, safe state.

Referring to FIG. 4 there is shown the LD output interface. Parts of the LD output interface which serve the same functions as parts of the SB output interface shown in FIG. 3 are indicated by the same reference numerals. Inasmuch as additional current is needed to drive an output signal lamp 82 which is connected to the LD terminals of the interface, an additional transistor current amplifier stage 84 is used so as to simulate the relay contact and provide the current level required for the signal lamp 82. When light out or failure of filament in lamp 82 is to be checked the LOCK line is placed in a logic low (0 volts) state, current then flows through the LED emitter 86 of an optical isolator 88 similar to the isolator 72 (FIG. 3). The phototransistor 89 of the isolator 88 is then turned on. Another transistor 90 switches on and current passes through a resistor 92 to the output line. The resistor 92 has a value such that the core in the saturable transformer of the absence of current detector will saturate, but this current will be insufficient to illuminate the signal lamp 82.

The serial digital signal is then applied to the CKIN input in the absence of current detector 58. If this signal cannot be transmitted through the detector 58, it is an indication that the filament of the lamp 82 is not open and is intact. If the signal is transmitted between CKIN and CKOUT of the detector 58, the presence of the CKOUT digital signal indicates that the filament is open and the lamp 82 should be replaced.

Figure 5:
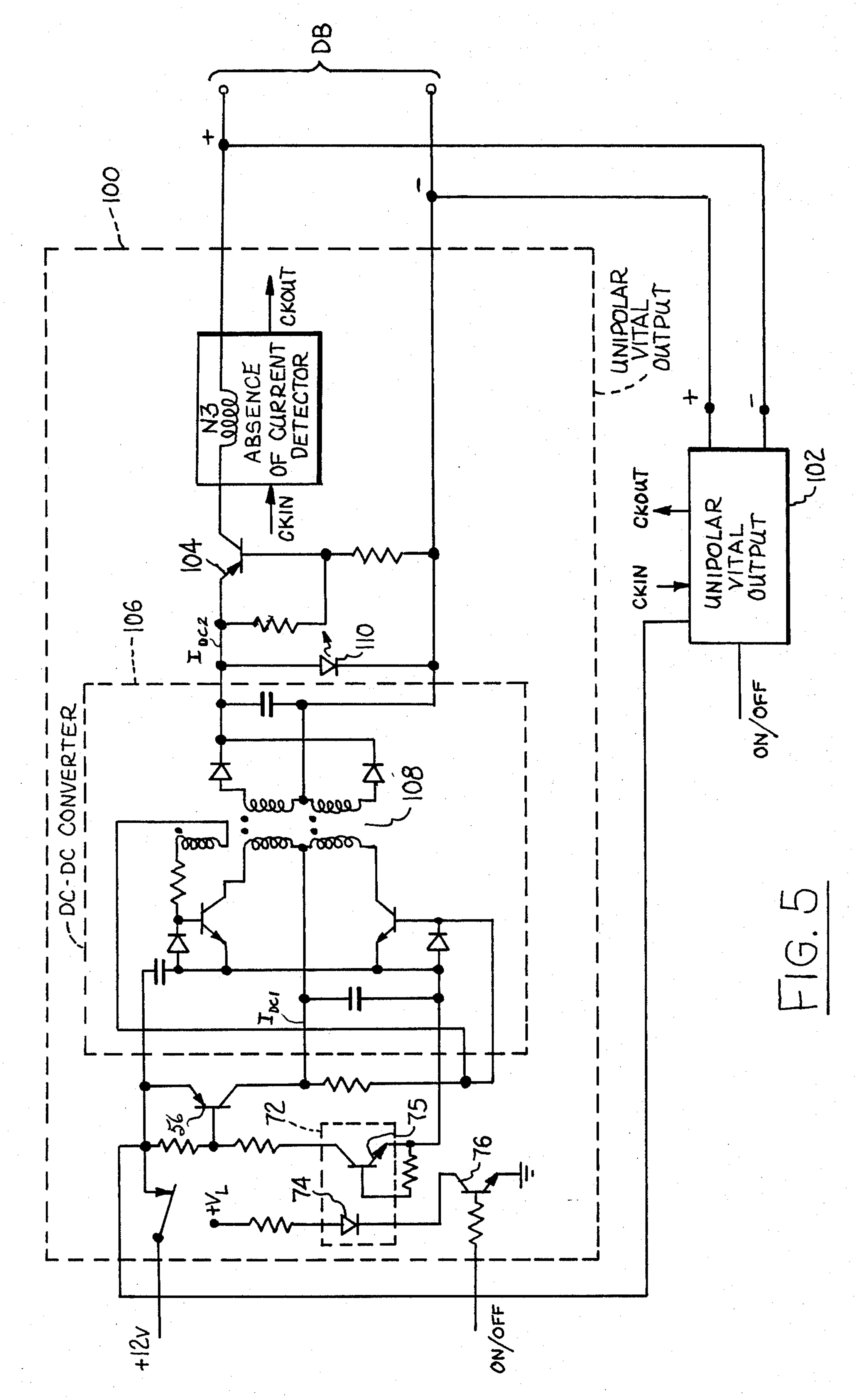
FIG. 5 is a schematic diagram illustrating a vital output interface which provides a double break or bipolar output.

Referring to FIG. 5 the double break (DB) output circuit is shown. Channels 100 and 102 can be used individually to provide unipolar DB outputs or they can be used together to provide a bipolar DB output, as shown. To provide a bipolar output, the outputs of each channel are connected with reverse polarity. This is equivalent to two relays, the contacts of which control both positive and negative current through a load. Each of the unipolar vital outputs 100 and 102 of each channel is identical, both are operated by vital energy from the contacts of the vital relay 20. Both vital outputs 100 and 102 use an absence of current detector 58 and the CKIN and CKOUT lines are connected to this detector 58. The output lines of each vital output, are broken into two portions where the DC currents $I_{DC1}$ and $I_{DC2}$ flow, respectively. The first portion is identical to the SB output circuit and like parts are labeled by like reference numerals. The second part utilizes a series transistor switch 104 for isolating one channel when the other is operated from the other channel, as will be explained more fully below.

The portion of the output line which carries $I_{DC1}$ is isolated from the portion which carries $I_{DC2}$ by a DC to DC converter 106 this DC to DC converter utilizes a transformer 108, the primary and secondary of which are insulated from each other by insulation sufficient to meet the 3000 volt insulation level specified by AAR for circuits to be considered isolated. The DC to DC converter is essentially of conventional design. It provides a DC output voltage when the transistor 56 is turned on.

The switching transistor stage 104 enables the unipolar outputs 100 and 102 to be connected with opposite polarity, as shown, to provide the equivalent of a bipolar output. When the second channel unipolar output 100 is off, that is the vital processor places a low or off signal level on its on/off input, a DC output voltage is applied to the transistor 104 so that its base will be negative with respect to its emitter, the transistor 104 is conductive. The equivalent transistor 104 in the other vital output 102 is then reversed biased so that the current path for $I_{DC2}$ in the unipolar vital output 102 is open. The unipolar vital output 102 therefore is prevented from short circuiting the unipolar vital output 100.

An LED 110 may be connected across the DC to DC converter. Accordingly, when the converter provides an output voltage; the transistor 76 being on and the contacts 20 being closed, the LED will light and the on condition of the unipolar vital output will be indicated.

Figures 6, 6A:
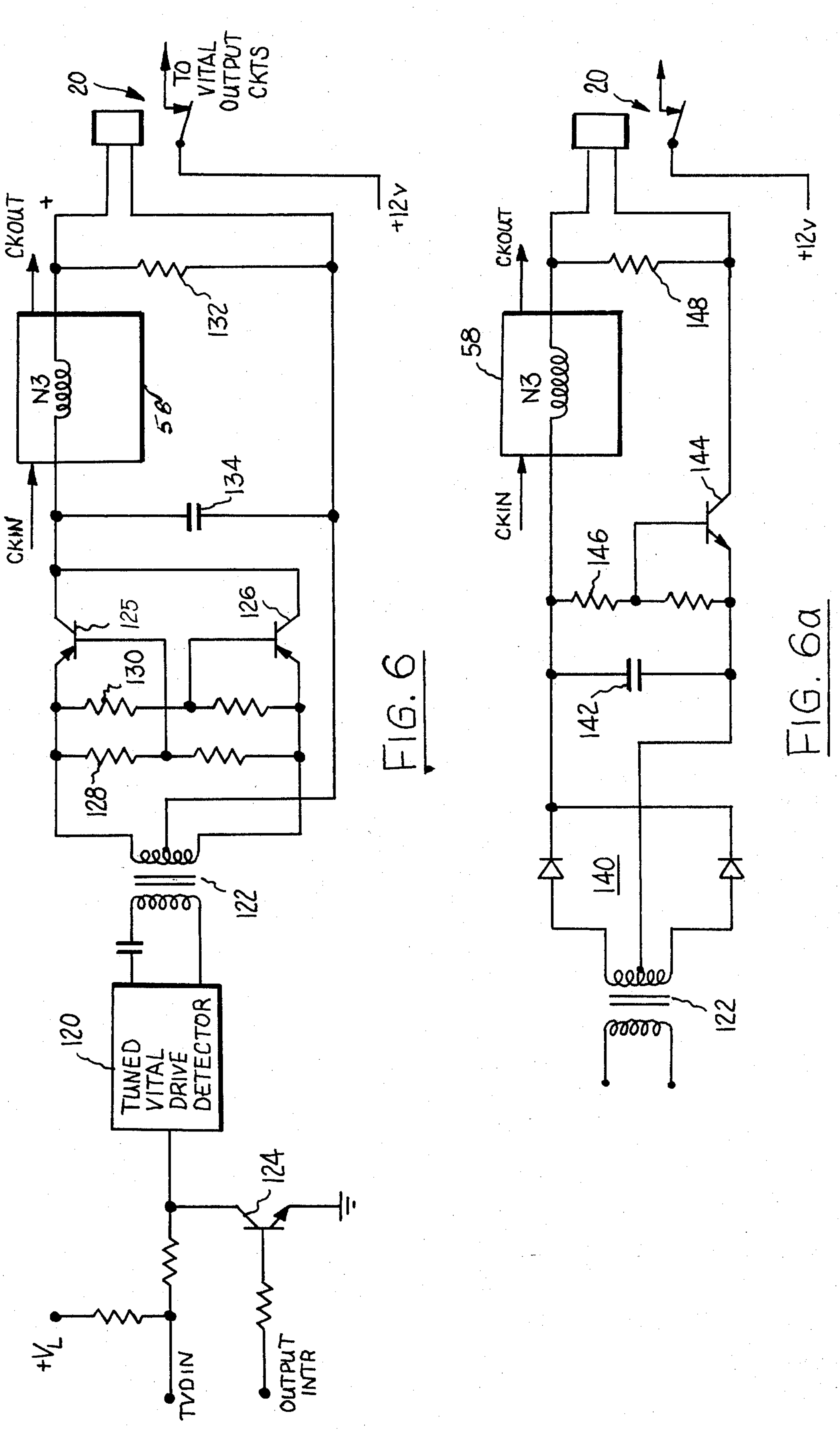
FIG. 6 is a schematic diagram which illustrates the vital decoder shown in FIG. 1.
FIG. 6*a* shows a schematic diagram of a portion of a vital decoder similar to the decoder shown in FIG. 6, but utilizing a somewhat simplified output circuit.

Referring to FIG. 6 the vital decoder 18 is shown the tuned vital drive (TVD) input is obtained as a result of the processing of the digital signals from the CKOUT lines of the vital outputs this processing produces the double modulated pulse train which constitutes the TVD signal. Reference may be had to the following U.S. Patents for more information on dual frequency, tuned vital drive: Smith et al, 4,352,475 issued Oct. 5, 1982, and Brockman 3,442,262, issued Feb. 1, 1966. Digital circuitry for converting an input digital signal to a TVD signal may, for example, be comprised of a microprocessor and the necessary peripheral integrated circuits. This processor system is programmed to accept the digital input signal and, if it is exactly correct, output the correct TVD signal. It will be appreciated of course that either single or double frequency modulation may be used. The modulation is detected by a tuned vital driver 120, which may consist of a first envelope detector which detects the presence of the carrier component of the TVD signal and a successive envelope detector which detects the modulation of that carrier and provides an AC output which is capacitively coupled to the primary winding of an output transformer 122. A transistor switch 124 connected across the input of the tuned vital drive detector 120 has an input from the processor to short circuit the TVD input when the absence of current detector 58 is operated to perform the vital checking of the vital decoder 18.

In the event of loss of AC drive (that is, the AC signal which is detected by the tuned vital drive 120 and appears across the output winding of the transformer 122), it is desirable that the vital relay 20 be permitted to drop away very rapidly, for example in less than forty milliseconds. This is accomplished by utilizing a pair of transistors 124 and 126, the collector to emitter paths of which are connected to opposite ends of the output winding of the transformer 122. In the presence of AC output current, the transistors are biased on by voltage dividers 128 and 130 provided by resistors connected across the output winding of the transformer 122. With AC drive removed, during the transient decay time of the circuit because of the inductance of the winding of the relay 20, the transistors 125 and 126 are turned off, then the only path for the transient current is through a shunt resistor 132. This resistor 132 may for example have a value of 4.7K ohms. With a typical B-type vital relay the transient, decay time is less than 40 milliseconds. The transistors 125 and 126 also protect the circuit and provide isolation. During normal operating conditions, when the AC signal is presented across the output winding of the transformer 122, the transistors 125 and 126 act as diodes and full wave rectify the AC signal. This signal is filtered by a capacitor 134 which produces the direct current for maintaining the relay 20 pulled in. Upon a failure in the system, the AC output signal is no longer produced, the TVD input being absent. Then the transistors 125 and 126 act as switches and quickly cause the decay of the transient current due to the inductance of the relay 20.

Referring to FIG. *6a*, there is shown another output circuit for the vital decoder which is connected between the output transformer 122 and the operating winding of the vital relay 20. A full wave diode rectifier 140, with its filter capacitor 142, rectify the AC signal and provides the DC output current for operating the relay 20. A transistor switch 144 is connected in series with the output line. This switch operates much like the transistor switch 104 which was described in connection with FIG. 5. Upon occurrence of any reverse potential due to the transient, or when the AC drive and the DC output from the rectifier 140 fails, the transistor 144 does not have the bias voltage which is applied to its base from voltage divider resistors 146. Accordingly, the transistor 144 cuts off. The discharge path for the transient current due to the inductance of the operating winding of the relay 20 is through the shunt resistor 148, thereby providing rapid drop away of the relay 20. The circuit shown in FIG. *6a* may be somewhat more cost effective than the circuit shown in FIG. 6.

From the foregoing description, it will be apparent that there has been provided an improved railway signalling system with vital input and output interfaces so as to enhance the vital operating characteristics of computer based switching and control functions which may be used for interlocking purposes. Variations and modifications in the herein described system and in the various components hereof, in accordance with the invention, will undoubtedly suggest themselves to those skilled in the art of railway signalling. Accordingly, the foregoing description should be taken as illustrative and not in a limiting sense.

I claim:

1. Interface system for inputs to and outputs from a vital processor of railway signals which comprises vital input interface means connected to and operable under control of the vital processor for translating inputs from sources of railway signals into a plurality of serial digital signals, the format of each of which represents a fault in said input interface means itself, a plurality of output interface means connected to and operated by said vital processor for controlling the operation of railway signal and control devices, and means in said output interface means operated by said vital processor for repeatedly checking the validity of operation of said output interface means.

2. The interface system according to claim 1 wherein said vital input interface means each comprises circuit means using said railway signals as a source of operating energy which is present when said signal represents a permissive condition and absent when said signal represents a restrictive condition, and means for passing a drive digital signal through said circuit means for providing a serial digit signal if said format to represent said permissive condition, with any variation in said format representing said restrictive condition.

3. The interface system according to claim 2 wherein said input interface has an output for said serial digital signal, said means for passing includes a pair of optical isolators having light emitters and receptors, the first of said pair of isolators being responsive to said drive signal at its emitter and having its receptor connected to said source of operating energy, the second of said pair of optical isolators having its emitter connected to said source of operating energy and its receptor connected to said output.

4. The interface system according to claim 3 wherein circuit means powered by said source and including a switching transistor is connected between the receptor of said first isolator and the emitter of said second isolator.

5. The interface system according to claim 3 further comprising circuit means in said passing means including a switching transistor powered by said source and connected between the receptor of said first isolator and the emitter of said second isolator for inverting the polarity of said drive digital signal to provide said digital signals with said format at said output whereby to represent the sense, whether permissive or restrictive, of said railway signal and any failure in said input interface means as a restrictive sense representation.

6. The interface system according to claim 1 further comprising vital decoder means operable by said vital processor in response to outputs from said checking means for inhibiting said output interface means from controlling said railway signalling and control devices into an unsafe condition.

7. The interface system according to claim 6 wherein said output interface means includes means for connecting and disconnecting operating current to said devices, said current being connected when in a safe condition, said vital decoder means including means for disconnecting said operating current from said output interface means when said checking means outputs represent a failure in any of said output interface means.

8. The interface system according to claim 7 wherein said vital decoder means comprises means for providing and maintaining an AC signal the absence of which represents a failure condition, means for rectifying said AC signal to provide an output DC current along an output line, a relay having an operating winding connected in series with said output line and also having contacts, said relay being energized in response to said output DC current to connect said operating current to said output interface means and providing said disconnecting means, and means responsive to the absence of said AC signal for switching open said output line to the energize said relay and enable said contacts thereof to open.

9. The interface system according to claim 8 further comprising tuned vital drive detector means providing said AC signal.

10. The interface system according to claim 8 further comprising checking means in said output line responsive to the absence of DC current therein when said AC signal is interrupted for the detecting failures in said vital decoder means.

11. The interface system according to claim 10 wherein said checking means includes a saturable transformer having input and output windings and another winding connected in series with said output line for saturating said transformer in the presence of said output DC current, and means for applying a serial digital signal to said input winding and deriving an output digital signal when said DC current is absent.

12. The interface system according to claim 8 wherein said rectifying means and means responsive to the absence of said AC signal comprises at least one transistor having an emitter, collector and base, rectifier circuit means including said transistor for rectifying said AC signal, and at least one resistor connected between said emitter and base for enabling said transistor to be biased into conduction.

13. The interface system according to claim 12 further comprising a transformer having an output winding for providing said AC signal, a full wave rectifier circuit including said transistor having its emitter and collector connected between one end of said transformer output winding and said output line, and another transistor having its emitter and collector connected to the other end of said transformer output winding, said output line being connected through said relay operating winding to a tap between the ends of said transformer output winding, a plurality of resistors connected across the ends of said transformer output winding, the bases of said transistors being connected to the junctions between said resistors.

14. The interface system according to claim 12 further comprising a transformer having an output winding for providing said AC signal, rectifier means connected across said transformer output winding and to said line for providing said output DC current, said line being connected through said relay operating winding to said transformer output winding, a resistor connected across said relay operating winding, a transistor having an emitter, collector and base, said emitter and collector being connected in series with said DC output line, a resistor divider connected across said rectifier means winding and to the base of said transistor for developing bias voltage when said AC signal is present and is rectified which biases said transistor into conduction and reverse biases said transistor to cutoff when said AC signal is absent.

15. The interface system according to claim 1 wherein each of said output interface means comprises circuit means for providing a path for the flow of operating current to a different one of said railway signal and control devices, electronic switch means for maintaining said current flow to condition said device into a permissive state and terminating and making absent said current flow to condition said device into a restrictive state, and wherein said checking means comprises means coupled to said current path and responsive to the absence of said current flow therein and operable when said switch means provides said restrictive state and said current is present to provide an output representing a failure in said output circuit means.

16. The interface system according to claim 15 wherein said electronic switch means comprises at least one switching transistor having a collector, base and emitter, means for connecting operating current for the device to said path through said transistor between the collector and emitter thereof, an optical isolator having a light emitter and a light receptor, said receptor being coupled to said base, and means connected to said light emitter for turning the light emitted therefrom on and off to cause switching of said operating current by said transistor.

17. The interface system according to claim 15 wherein said absence of current detector means comprises saturable transformer means coupled to said path.

18. The interface system according to claim 17 wherein the device is a railway signal lamp having a filament, and further comprising circuit means operative when said electronic switch means is open to make absent current flow along said path to said lamp for providing a current sufficient to saturate said saturable transformer means and insufficient to illuminate said lamp, whereby the presence of said output from said detector means represents an open condition of said filament.

19. The interface system according to claim 17 wherein said absence of current detector means comprises an input circuit and an output circuit coupled to said saturable transformer means for transmitting a serial digital signal to said transformer means only when said transformer means is unsaturated in the absence of said current.

20. The interface system according to claim 19 further comprising means included in at least one of said input and output circuits and said transformer for providing said digital signal from said output digital circuit inverted in polarity from said signal as applied to said input digital circuit.

21. The interface system according to claim 19 wherein said saturable transformer has a core of saturable magnetic material having first, second and third windings thereon, said third winding being connected in said current path and said first and second winding being connected to said input and output circuits, respectively, and wherein said core is characterized by being saturable in response to a current amplitude not exceeding 50% of the amplitude of the current necessary to maintain said device operated to its permissive state.

22. The interface system according to claim 15 comprising a first channel and a second channel each providing a DC output voltage across a pair of output lines of opposite polarity, said output lines of said first channel and said second channel which are of opposite polarity being connected together to provide a bipolar output, each of said first and second channels having separate ones of said circuit means providing said path, electronic switch means and checking means, said path having a first portion and a second portion, said second portion being provided by said output lines, said checking means being coupled to said second portion, and means for isolating said first and second portions.

23. The interface system according to claim 22 wherein said isolating means is a DC to DC converter circuit.

24. The interface system according to claim 23 wherein said DC to DC converter circuit has an input isolator section transformer coupled to an output rectifier section, said rectifier section being connected to said output lines, and said electronic switch means being connected to said input isolator section.

25. The interface system according to claim 24 wherein at least one of said lines has a transistor connected with its emitter to collector path in series therewith and between said output portion and said checking means, and means connected across said lines and to the base of said transistor for biasing said transistor into conduction in response to current flow along said lines in a forward direction from the line of positive to the line of negative polarity and to cut off in response to reverse current flow in the opposite direction from the line of negative to the line of positive polarity whereby said channels and said outputs therefrom are independent from each other.

26. A circuit for detecting the absence of DC current flowing in a line connected to a utilization device for operating said utilization device which comprises a saturable transformer having a core of saturable magnetic material, input and output windings on said core and a control winding also on said core, said control winding being connected in series with said line for providing magnetic flux which saturates that core in the presence of DC current of a magnitude less than necessary to operate said device, input means for applying a serial digital signal to said input winding, and output means coupled to said output winding and responsive to the digital signal coupled through said transformer to detect the absence of current in said line.

27. The circuit according to claim 26 wherein at least one of said circuit means and said transformer causes the polarity of said digital signal to be inverted in transmission form the input from said input means to the output of said output means.

* * * * *